United States Patent [19]

Hojnowski

[11] 3,995,615
[45] Dec. 7, 1976

[54] SOLAR HEAT COLLECTOR PANEL

[76] Inventor: Edward J. Hojnowski, 112 Lagana Ave., Plantsville, Conn. 06479

[22] Filed: July 11, 1975

[21] Appl. No.: 595,372

[52] U.S. Cl. .............................. 126/271; 126/270
[51] Int. Cl.² .......................................... F24J 3/02
[58] Field of Search ............ 126/270, 271; 237/1 A

[56] References Cited
UNITED STATES PATENTS 3,916,871  11/1975  Estes et al. ........................ 126/271

Primary Examiner—Kenneth W. Sprague
Attorney, Agent, or Firm—McCormick, Paulding & Huber

[57] ABSTRACT

A molded plastic base has longitudinally extended channels, with the channel walls being relieved at laterally spaced locations to define closely spaced posts which support a transparent cover. A flat metal heat absorbing plate is provided just below the cover, and has holes for loosely receiving the posts. A corrugated plate is welded to the underside of the heat absorbing plate to define fluid passageways, which passageways are located in the channels of the base. The plate assembly is supported at one end of the base by inlet and outlet pipes for circulation fluid to be heated, and at the opposite end the plate assembly is supported by a gas adsorbing device which operates from the expansion and contraction of the plate assembly in order to preserve the vacuum in the area surrounding the heat absorbing plate.

17 Claims, 4 Drawing Figures

SOLAR HEAT COLLECTOR PANEL

SUMMARY OF THE INVENTION

This invention relates generally to solar heat collecting panels, and deals more particularly with a relatively thin panel having a flat energy absorbing metal plate which is insulated from the panel base and its transparent cover by an evacuated space.

The panel construction described herein employs closely spaced posts projecting upwardly from the base to efficiently react the atmospheric pressure exerted on the transparent cover. The posts are preferably formed integrally in the base of plastic material and extend through openings in the plate. A corrugated backing plate is welded to the rear face of the heat absorbing plate to define fluid passageways which extend longitudinally between the posts. The plate assembly is supported at one end in the base by fluid inlet and outlet piping, and is supported at the opposite end on an expansion joint device which utilizes the daily variations in temperature of the metal plates to continually abrade a gas sorptive member, and hence preserve a vacuum around the heat absorbing plate and its associated passageways.

DETAILED DESCRIPTION

Figure 1:
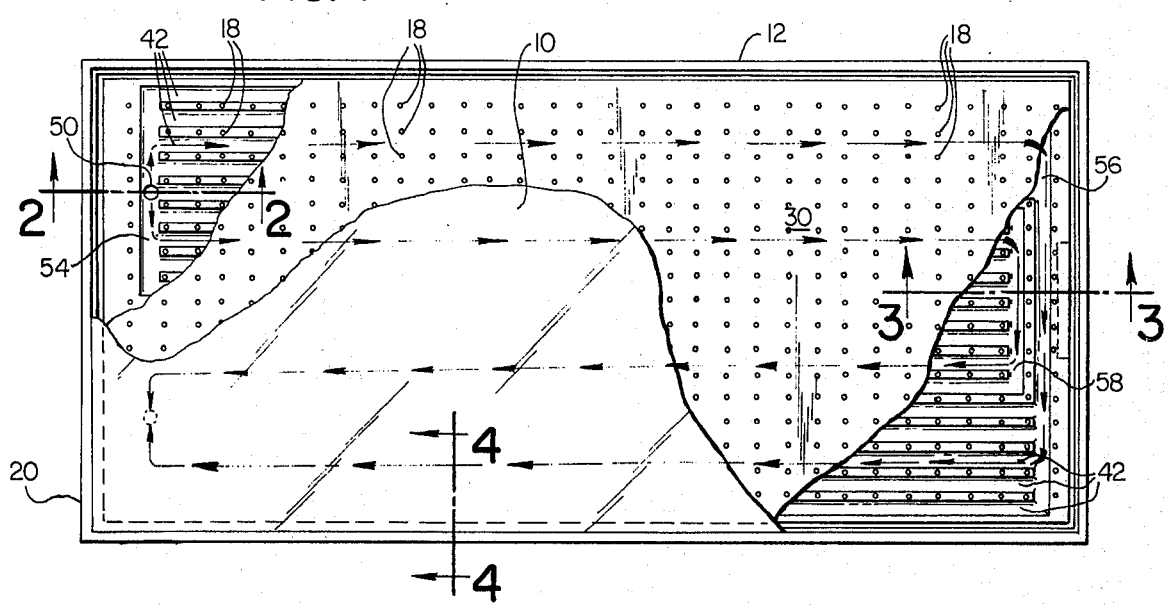
FIG. 1 is a plan view of a heat collector plate incorporating the present invention with the glass cover being shown broken away to reveal the heat absorbing plate, which plate is itself further broken away to reveal the corrugated plate provided behind the heat absorbing plate.

Turning now to the drawing in greater detail, the heat collector panel of the present invention preferably includes a transparent glass cover 10 which is adapted to pass solar energy in a major portion of the electromagnetic spectrum, and may be of such material as to inhibit the radiation from components within the panel especially those in the infra-red range. Although glass is the presently preferred material for the cover 10, it should perhaps be noted that other materials might also be used, as for example methacrylate plastic material such as sold under the LUCITE dand PLEXIGLAS trademarks.

The solar heat collector panel of FIG. 1 also includes a base 12 which is preferably fabricated from a molded plastic material having thermal expansion and conductivity characteristics similar to that of the glass cover 10. The coefficient of thermal expansion should be significantly less than that of the internal components to be described for reasons to be made clear hereinafter. The plastic material chosen for the base should also have a relatively low coefficient of thermal conductivity as well, this to enhance the efficiency of the panel from the point of view of heat lost to the surrounding atmosphere. However, it is an important feature of the present invention that the heat loss of the components within the panel is effectively minimized not so much as a result of the materials chosen for the cover 10 and base 12, but rather is attributed to the high degree of vacuum achieved within the panel, not only initially upon assembly of the panel, but also during extended periods of use as a result of the unique supporting device for the panel to be described hereinafter.

Figure 2:
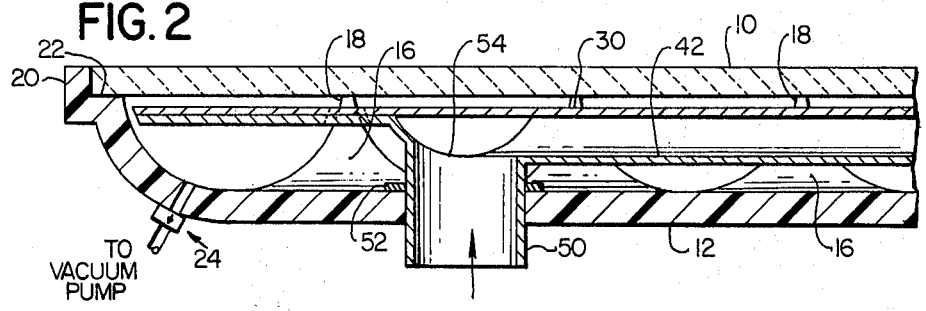
FIG. 2 is a sectional view taken generally on the line 2—2 of FIG. 1 but drawn to a somewhat larger scale and also indicating in schematic fashion a port for evacuating the cavity defined in the panel.
Figure 3:
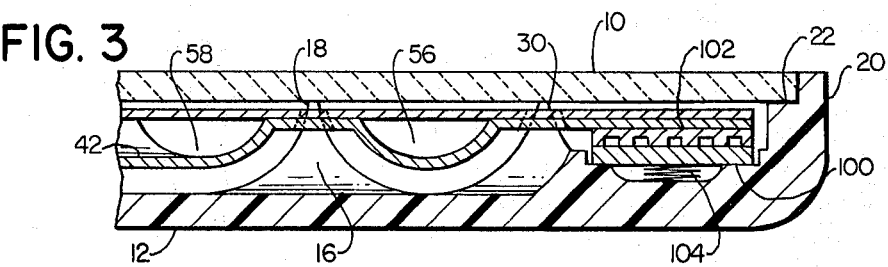
FIG. 3 is a sectional view taken generally on the line 3—3 of FIG. 1 being shown to a somewhat larger scale and revealing the expansion joint device for preserving the vacuum in the cavity.
Figure 4:
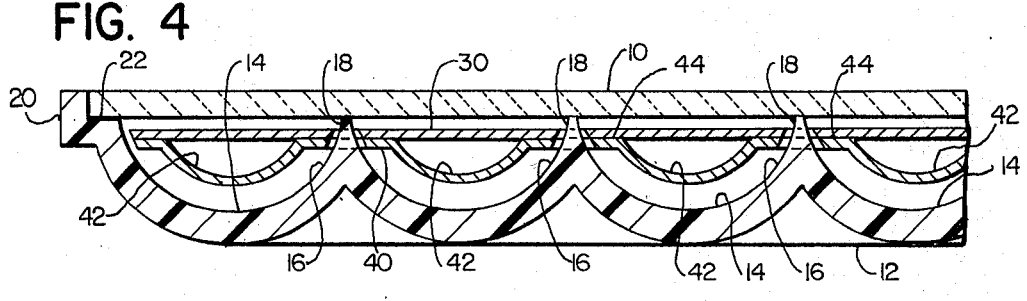
FIG. 4 is a sectional view taken generally on the line 4—4 of FIG. 1 also being to a somewhat larger scale than FIG. 1.

Still with reference to the base 12 amd referring more particularly to FIG. 4, the base can be seen from this view to define an upwardly open cavity having a corrugated floor 14 which defines a plurality of side-by-side longitudinally extending chananels. Each of these channels is defined by longitudidnally extending channel walls 16, 16, which walls include upper end portions 18, 18 for supporting the glass cover 10. As best shown in FIGS. 2 and 3, the channel walls 16, 16 are preferably cut away or grooved either during the molding process of the base, or afterwards, so that the uppermost ends 18, 18 of these channel walls define relatively small diameter circular posts. The posts 18, 18 are arranged in a closely-spaced generally rectangular, square pattern best shown in FIG. 1, said posts being spaced both longitudinally and laterally in the panel for efficiently reacting the atmospheric pressure exerted upon the glass cover 10. Still with reference to the base 12 the perimeter of the base can be seen from FIGS. 2, 3 and 4 to include a peripherally extending flange 20 which is adapted to receive the glass cover 10 and to be sealed in the area of the recess 22 by a suitable adhesive such that the cavity defined between the cover 10 and the base 12 can be conveniently evacuated through a port, indicated generally at 24 in FIG. 2 following assembly of the panel. It may further be necessary to bake the panel in an oven in order to reduce the vapor pressure of the plastic materials from which the base is fabricated. This can be done following assembly and prior to actually evacuating the cavity.

Turning next to a more detailed consideration of the components provided within the panel cavity for absorbing the solar energy, said means preferably comprises a generally flat metalic heat collector plate 30 which plate is provided with a plurality of openings for loosely receiving the posts 18, 18 the plate has a front face which is blackened with a coating of material well adapted to absorb solar radiation. The rear face of the plate 30 is provided with means defining longitudinally extending fluid passageways which are best shown in FIG. 4. Preferably, said passageway defining means comprises a corrugated plate 40 having corrugations adapted to fit within the channels defined by the base 12, and having area between the fluid passageway defining portions 42, 42 suitable for welding the corrugated plate 40 to the underside of the heat absorbing plate 30. These areas or lands are indicated generally at 44 in FIG. 4 and such areas include the hole defining portions of the heat absorbing plate 30. More particularly, holes are also provided in the corrugated plate 40 so as to receive the posts 18, 18 utilized to support the glass cover 10 as mentioned previously. The holes in the plate assembly 30 and 40 are preferably large enough, as compared to the cross sectional size of posts 18, 18 so that no interference occurs during expansion and contraction of the plate assembly.

It should perhaps be noted that while a corrugated plate 40 is illustrated in FIG. 4 the fluid passageway defining means carried by the underside of the heat collector plate 30 could also be provided in the form of individual strips defining each of the individual longitudinal passageways 42, 42. Furthermore, the opposite longitudinal end portions of the corrugated plate 40 require further fabrication in order to provide communication between the laterally spaced longitudinally extending passageways 42, 42 for the fluid to be heated. FIGS. 2 and 3 illustrate one of the longitudinally extending passageways 42 defined by the corrugated plate 40, and illustrate the manner of communication provided between this particular passageway 42 and the inlet pipe 50. This inlet pipe 50 includes a flange 52 which serves to support the corrugated plate 40 from the base 12 and it is a feature of the present invention that a similar pipe (not shown) is provided immediately below the pipe 50 of FIG. 1 so as to provide a convenient means for withdrawing heated fluid from the panel. An inlet header is illustrated generally at 54 such that communication is provided between approximately one half of the longitudinally extending fluid passageways 42, 42 at their respective inlet ends. A similar header is provided at the opposite end of the panel being indicated generally by reference numeral 56 in FIG. 1, and serves to provide communication between at least a portion of the outlet ends of each of the longitudinally extending passageways 42, 42. Although not shown, the outlet pipe also includes an outler header similar to the header 54 and arranged opposite thereto in the FIG. 1 panel such that the corresponding ends of the other half of the longitudinally extending passageways 42, 42 communicate with one another and at their respective outlet ends. Furthermore, a header 58 is provided at the right hand of the panel illustrated in FIG. 1 to provide communication between the remaining number of longitudinally extending fluid passageways such that fluid can be circulated through the panel as indicated generally by the broken line arrows of FIG. 1. Obviously, some of the fluid will utilize the header 56 associated with the right hand end of the panel of FIG. 1, and another portion of the fluid will utilize the header 58 also provided in the panel for this purpose. Two such headers 56 and 58 are provided at the right hand of the panel but it will be obvious to those skilled in the art that one header might be provided for this purpose, two being preferred in order to assure the proper rate of flow in each of the various passageways 42, 42.

Thus, the plate assembly comprising the heat collecting flat plate 30 together with its associated fluid passageway defining plate 40 is mounted in the base at the left hand end as a result of the fluid inlet and outlet pipes such as depicted at 50 in FIG. 2, and is supported at its right hand end as illustrated in FIG. 3. Fig. 3 comprises a unique expansion joint device whereby the expansion and contraction of the metalic plate assembly is taken advantage of in the unique design described herein, and as a result of this motion caused by daily variations in the incident solar energy, a bar of titanium is provided in the base 12 with a file member 102 being provided on the underside of the lower plate 40 such that movement of the plate assembly with respect to the base 12 causes the titanium bar 100 to be continually abraded, and any gases within the evacuation space to be absorbed by the titanium bar 100. This action preserves the vacuum within the cavity. The titanium bar 100 may be spring biased upwardly as a result of the spring 104 provided between the base and the member 100, and the file member 102 is preferably carried by the underside of the plate assembly but it will, of course, be apparent that the locations for these members might be reversed, with the titanium bar being carried by the plate aassembly and the file member being provided in a suitable receptacle defined in the base 12. Any suitable gas adsorptive material can be used in place of the titanium bar 100. For example, barium is also known to have gas adsorptive characteristics. The capacities for absorbing gas of titanium or barium are recognized but are necessarily limited because of the formation of oxide films. However, reactivation of the oxide film may be accomplished either by evaporation or a fresh deposit on top of the old one, or alternatively by abrading the old surface to remove the oxide or protective skin in order to expose the fresh surface beneath. One laboratory approach to accomplishing the abrading step is to provide a trough made of sheet titanium in which a few pieces of carbon or pieces of an old metal file are placed. When this arrangement is mounted in a glass bottle shaking of the abrasive in the titanium trough causes a significant drop in gas pressure.

Other features of the solar heat collecting panel shown are the provision of a black coating of suitable material on the upper surface or face of the heat collecting plate 30 and the provision of a reflective coating on the floor of the base cavity and more particularly in each of the channels 14, 14 defined by the base 12.

I claim:
1. A solar heat collector panel comprising:
   a. a base defining an upwardly open cavity with a floor,
   b. a cover for closing said base cavity to allow evacuating of said cavity,
   c. a flat heat collector plate in said base cavity and spaced downwardly below the underside of said cover,
   d. means defining longitudinally extending fluid passageways in said plate,
   e. means supporting said plate including at least one plate support member mounted in said base, and a member adapted to cooperate with said plate support member and carried by the underside of said collector plate, one of said members being made from a gas sorptive material, the other of said members engaging said gas sorptive member to abrade it in response to movement of said collector plate relative to said base due to thermal expansion and contraction of said plate caused by variations in the incident solar energy.

2. A solar heat collector panel comprising a base defining an upwardly open cavity with a floor, a plurality of longitudinally and laterally spaced posts projecting upwardly into said cavity from said base, a cover for closing said base cavity to allow evacuating said cavity, said cover being supported on said posts, a flat heat collector plate in said base cavity and spaced downwardly below the underside of said cover, said plate having a plurality of openings for loosely receiving said posts, means carried by the underside of said plate and defining longitudinally extending fluid passageways, and means supporting said plate and said passageway defining means in spaced relationship above the floor of said base cavity, means supporting said plate including at least one plate support member mounted in said base, and a member adapted to cooperate with said plate support member and carried by the underside of said collector plate, one of said members being made from a gas sorptive material, the other of said members engaging said gas sorptive member to abrade it in response to movement of said collector plate relative to said base due to thermal expansion and contraction of said plate caused by variations in the incident solar energy.

3. A solar heat collector panel comprising a base defining an upwardly open cavity with a floor, a plurality of longitudinally and laterally spaced posts projecting upwardly into said cavity from said base, a cover for closing said base cavity to allow evacuating said cavity, said cover being supported on said posts, a flat heat collector plate in said base cavity and spaced downwardly below the underside of said cover, said plate having a plurality of openings for loosely receiving said posts, means carried by the underside of said plate and defining longitudinally extending fluid passageways, and means supporting said plate and said passageway defining means in spaced relationship above the floor of said base cavity, said base defines a plurality of side-by-side longitudinally extending channels, each channel defining a longitudinally extending cavity for at least one of said fluid passageways, and each channel having side walls which define said posts.

4. The solar heat collector panel defined by claim 2 wherein said means supporting said plate further includes fluid inlet and outlet headers for said longitudinally extending fluid passageways, said headers having inlet and outlet pipes which support said plate from said base, said inlet and outlet support pipes being located in longitudinally spaced relationship to said plate support member.

5. The solar heat collector panel defined by claim 3 wherein said base is integrally formed from a molded plastic material having thermal expansion and conductivity characteristics at least approximately equal to those of glass, said cover comprising a transparent glass material.

6. The solar heat collector panel defined by claim 2 wherein said heat collector plate has a black coating of material well adapted to absorb solar radiation.

7. The solar heat collector panel defined by claim 6 wherein said base floor has a reflective coating of material well adapted to reflect solar radiation.

8. The solar heat collector panel defined by claim 7 wherein said base is integrally formed from a molded plastic material having thermal expansion and conductivity characteristics at least approximately equal to those of glass, said cover comprising a transparent glass material.

9. The solar heat collector panel defined by claim 8 wherein said base defines a plurality of side-by-side longitudinally extending channels, each channel defining a longitudinally extending cavity for at least one of said fluid passageways, and each channel having side walls which define said posts.

10. The solar heat collector panel defined by claim 2 wherein said gas sorptive material is selected from the group comprising titanium, barium, zirconium or the like.

11. The solar heat collector panel defined by claim 1 wherein said base defines a plurality of side-by-side longitudinally extending channels, each channel defining a longitudinally extending cavity for at least one of said fluid passageways, and each channel having side walls which define posts projecting upwardly into said base cavity for supporting said cover, said plate having a plurality of openings for loosely receiving said posts.

12. The solar heat collector panel defined by claim 11 wherein said plate is further supported by fluid inlet and outlet headers for said longitudinally extending fluid passageways, said headers having inlet and outlet pipes which support said plate from said base, said inlet and outlet support pipes being located in longitudinally spaced relationship to said plate support member.

13. The solar heat collector panel defined by claim 11 wherein said base is integrally formed from a molded plastic material having thermal expansion and conductivity characteristics at least approximately equal to those of glass, said cover comprising a transparent glass material.

14. The solar heat collector panel defined by claim 11 wherein said heat collector plate has a black coating of material well adapted to absorb solar radiation.

15. The solar heat collector panel defined by claim 14 wherein said base floor has a reflective coating of material well adapted to reflect solar radiation.

16. The solar heat collector panel defined by claim 13 wherein said base defines a plurality of side-by-side longitudinally extending channels, each channel defining a longitudinally extending cavity for at least one of said fluid passageways, and each channel having side walls which define said posts.

17. The solar heat collector panel defined by claim 1 wherein said gas sorptive material is selected from the group comprising titanium, barium, zirconium or the like.

* * * * *